United States Patent
Chiu et al.

(10) Patent No.: US 12,541,120 B2
(45) Date of Patent: Feb. 3, 2026

(54) CONTACT LENS AND METHOD OF MANUFACTURING THE SAME

(71) Applicant: PEGAVISION CORPORATION, Taoyuan (TW)

(72) Inventors: Hsien-Ting Chiu, Taoyuan (TW); Yi-Hung Lin, Taoyuan (TW); Ying-Jhen Huang, Taoyuan (TW)

(73) Assignee: PEGAVISION CORPORATION, Taoyuan (TW)

( * ) Notice: Subject to any disclaimer, the term of this patent is extended or adjusted under 35 U.S.C. 154(b) by 943 days.

(21) Appl. No.: 17/445,497

(22) Filed: Aug. 19, 2021

(65) Prior Publication Data

US 2022/0057655 A1 Feb. 24, 2022

Related U.S. Application Data

(60) Provisional application No. 63/068,383, filed on Aug. 21, 2020.

(51) Int. Cl.
*G02C 7/10* (2006.01)
*G02B 1/04* (2006.01)
*G02C 7/04* (2006.01)
*B82Y 20/00* (2011.01)

(52) U.S. Cl.
CPC ............ *G02C 7/108* (2013.01); *G02B 1/043* (2013.01); *G02C 7/04* (2013.01); *B82Y 20/00* (2013.01)

(58) Field of Classification Search
CPC .................. G02C 7/108; G02C 7/04
USPC .............. 351/159.31, 159.02, 159.6
See application file for complete search history.

(56) References Cited

U.S. PATENT DOCUMENTS

| | | | |
|---|---|---|---|
| 3,476,499 A | 11/1969 | Wichterle | |
| 3,957,740 A | 5/1976 | Blank et al. | |
| 3,962,505 A * | 6/1976 | Avery | G02C 7/049 |
| | | | 156/303.1 |
| 4,669,834 A * | 6/1987 | Richter | G02C 7/108 |
| | | | 351/159.24 |
| 5,617,154 A * | 4/1997 | Hoffman | B29D 11/00903 |
| | | | 351/159.32 |

(Continued)

FOREIGN PATENT DOCUMENTS

| | | | | |
|---|---|---|---|---|
| CN | 1419151 A | * | 5/2003 | ............... G02C 7/10 |
| CN | 109212777 A | | 1/2019 | |

(Continued)

*Primary Examiner* — Zachary W Wilkes
(74) *Attorney, Agent, or Firm* — CKC & Partners Co., LLC

(57) ABSTRACT

A contact lens and a method of manufacturing the same are provided. The contact lens includes a contact lens body and a blue light blocking material covering the contact lens body. The blue light blocking material includes a plurality of metal particles dispersed on the contact lens body. The present invention includes compositions of at least one compound including metal ion with at least one or more reducing factors. The interactions between reducing factors endow contact lens body with homogeneous or pupil-regional preference of metal particles distribution with enhanced or decreased efficacy of blue light blocking. A further modification strengthens surface properties of contact lens including contact angle, water break-up time and long-term protein depositions.

4 Claims, 10 Drawing Sheets
(1 of 10 Drawing Sheet(s) Filed in Color)

(56) References Cited

U.S. PATENT DOCUMENTS

| | | | |
|---|---|---|---|
| 6,811,257 B1* | 11/2004 | Lehat | G02C 7/12 |
| | | | 351/159.6 |
| 6,874,888 B1* | 4/2005 | Dudai | G02C 7/04 |
| | | | 351/159.56 |
| 7,438,411 B2* | 10/2008 | Payne | G02C 7/108 |
| | | | 351/159.01 |
| 8,425,033 B2* | 4/2013 | Bowers | B29D 11/00317 |
| | | | 351/159.28 |
| 9,708,087 B2 | 7/2017 | Qiu | |
| 10,048,405 B2 | 8/2018 | Lai | |
| 10,234,608 B2* | 3/2019 | Blair | G02B 5/206 |
| 11,530,351 B2* | 12/2022 | Chen | G02C 7/102 |
| 12,007,531 B2* | 6/2024 | Kim | C08G 77/38 |
| 2001/0032565 A1 | 10/2001 | Nohr et al. | |
| 2004/0150787 A1* | 8/2004 | Niculas | G02C 7/046 |
| | | | 351/159.02 |
| 2006/0275596 A1* | 12/2006 | Payne | G02B 1/043 |
| | | | 428/323 |
| 2007/0298242 A1 | 12/2007 | Huo | |
| 2010/0055454 A1 | 3/2010 | Tadakuma | |
| 2012/0008217 A1 | 1/2012 | Ishak et al. | |
| 2015/0138661 A1* | 5/2015 | Blair | G02B 5/008 |
| | | | 359/885 |
| 2015/0362757 A1 | 12/2015 | Fu | |
| 2018/0250899 A1 | 9/2018 | Chien | |
| 2018/0267331 A1 | 9/2018 | Abbasi et al. | |
| 2019/0009482 A1 | 1/2019 | Lai et al. | |
| 2020/0174160 A1 | 6/2020 | Qiu et al. | |
| 2020/0308481 A1* | 10/2020 | Chen | C09B 23/105 |
| 2021/0003754 A1* | 1/2021 | Gu | G02B 5/008 |
| 2022/0057653 A1 | 2/2022 | Chiu et al. | |
| 2022/0057655 A1 | 2/2022 | Chiu et al. | |
| 2023/0288728 A1* | 9/2023 | Mahadevan | C09B 23/0058 |

FOREIGN PATENT DOCUMENTS

| | | |
|---|---|---|
| CN | 107045212 B | 11/2019 |
| CN | 213122489 U | 5/2021 |
| CN | 113214586 A | 8/2021 |
| EP | 3173826 A1 | 5/2017 |
| GB | 2202962 A | 10/1988 |
| JP | 2008133535 A | 6/2008 |

* cited by examiner

CONTACT LENS AND METHOD OF MANUFACTURING THE SAME

CROSS-REFERENCE TO RELATED APPLICATION

This application claims priority to U.S. Provisional Application Ser. No. 63/068,383, filed Aug. 21, 2020, which is herein incorporated by reference.

BACKGROUND

Field of Invention

The present invention relates to a contact lens and a method of manufacturing the same. More particularly, the present invention relates to a contact lens with an ability of blue light blocking and reduced protein deposition and a method of manufacturing the same.

Description of Related Art

In a recent decade, digital eye strain (DES), also known as computer vision syndrome, is a critical public health challenge. It indicates a serial syndrome of visual disturbance, dryness, or discomfort associated with the prolonged use of digital devices with other directly or indirectly environmental stress on eye. Therefore, developing contact lenses with blue light blocking for reducing the impact of blue light has become a trend.

Commercial blue light blocking contact lenses are applied through addition of chemical pigment or dye. However, these materials generally have hydrophobic benzene structure, which affects the comfort of wearing. Further, commercial blue light blocking contact lenses have low blue-light blocking efficacy (less than 25%) and darker color (yellow or amber color). These undesired disadvantages in turn may lead to negative influence on the preference of contact lens for general users. For example, due to cosmetic reasons, photochromism throughout the entire contact lens area, particularly in edge region are not desired. Hence, contact lens with less yellow color or photochromism concentrated in the central pupil region is more preferred for general public.

Accordingly, there remains a controllable and efficient synthetic strategy to fabricate an ophthalmic device, such as contact lenses, which not only exhibits efficient blue-light blocking with relatively less yellowish appearance, but also enhances surficial properties.

SUMMARY

In accordance with an aspect of the present disclosure, a contact lens is provided. The contact lens includes a contact lens body and a blue light blocking material covering the contact lens body. The contact lens body includes a central region and a peripheral region surrounding the center region. The blue light blocking material includes a plurality of metal particles dispersed on the contact lens body and the plurality of metal particles in the central region are more than in the peripheral region.

According to some embodiments of the present disclosure, the plurality of metal particles include silver, gold, cobalt, manganese, nickel, copper, zinc, platinum, palladium, cadmium, indium, potassium, calcium, iron, or combinations thereof.

According to some embodiments of the present disclosure, the contact lens includes about 1 wt % to about 20 wt % of blue light blocking material based on a total weight of the contact lens.

According to some embodiments of the present disclosure, the plurality of metal particles have a diameter of about 1-10000 nm.

According to some embodiments of the present disclosure, the contact lens exhibits tunable plasmonic resonances at visible light ranged from 380-800 nm.

According to some embodiments of the present disclosure, the contact lens inhibits about 5% to about 99% of blue light at wavelength ranged within 380 nm to about 480 nm.

According to some embodiments of the present disclosure, the contact lens has an averaged water contact angle of about 30-70 degrees.

According to some embodiments of the present disclosure, the contact lens has an averaged hysteresis of about 0.1-35 degrees.

According to some embodiments of the present disclosure, the contact lens body includes a hydrogel contact lens or a silicone hydrogel contact lens.

According to some embodiments of the present disclosure, the contact lens body includes carboxyl, amine, hydroxyl, or pyrrolidone group.

In accordance with another aspect of the present disclosure, a method of manufacturing a contact lens is provided. A contact lens body is provided. The contact lens body is then immersed with a first reaction solution to form a contact lens having a blue light blocking material covering the contact lens body. The first reaction solution includes a solvent, at least one compound including a metal ion, and a plurality of reducing agents. The plurality of reducing agents are for reducing the metal ion into a metal particle, in which the plurality of reducing agents at least include a first kind of reducing agent of potassium tert-butoxide.

According to some embodiments of the present disclosure, the method further includes treating the contact lens body with a second reaction solution after immersing the contact lens body with the first reaction solution. The second reaction solution includes a solvent, at least one compound including a metal ion, and at least one reducing agent for reducing the metal ion into a metal particle, in which the reducing agent includes ascorbic acid.

According to some embodiments of the present disclosure, the solvent includes a water soluble solvent.

According to some embodiments of the present disclosure, the metal ion includes silver ion, gold ion, cobalt ion, manganese ion, nickel ion, copper ion, zinc ion, platinum ion, palladium ion, cadmium ion, indium ion, potassium ion, calcium ion, iron ion, or combinations thereof.

According to some embodiments of the present disclosure, the plurality of reducing agent include at least one functional group including carboxyl group, amine group, thiol group, sulfide group, aldehyde group, hydroxyl group, alkoxide group, N-heterocycle group, pyrrolidone group, borohydride group, or combinations thereof.

According to some embodiments of the present disclosure, the plurality of reducing agents include a second kind of reducing agent of glycol-based reducing agent.

According to some embodiments of the present disclosure, the method further includes performing a heating process at a temperature ranged from 25° C. to 135° C. when immersing the contact lens body with the first reaction solution.

According to some embodiments of the present disclosure, the heating process includes heating a container accommodated the contact lens body and the first reaction solution in an incubator for about 20 minutes to about 24 hours.

According to some embodiments of the present disclosure, the incubator includes an oven, an autoclave sterilizer, or a water bath incubator.

According to some embodiments of the present disclosure, the method further includes packaging the contact lens with a package solution; and performing a sterilization process.

According to some embodiments of the present disclosure, the package solution includes ascorbic acid.

It is to be understood that both the foregoing general description and the following detailed description are by examples, and are intended to provide further explanation of the invention as claimed.

BRIEF DESCRIPTION OF THE DRAWINGS

The patent or application file contains at least one drawing/photograph executed in color. Copies of this patent with color drawing(s)/photograph(s) will be provided by the Office upon request and payment of the necessary fee.

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
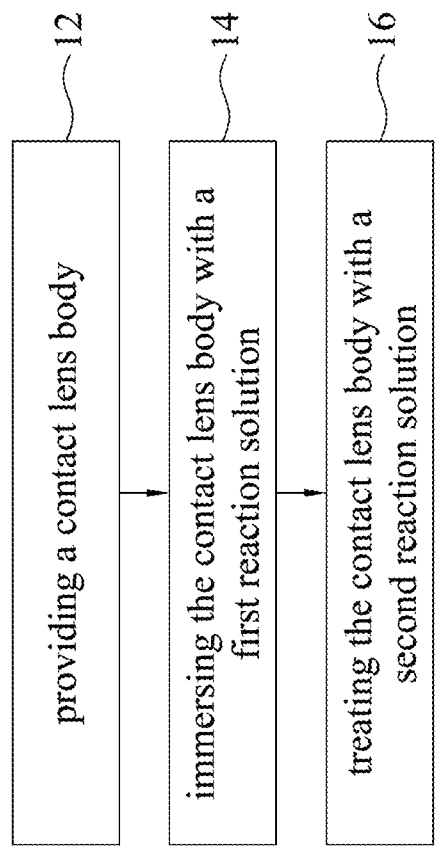
FIG. 1 is a flow chart illustrating a method of manufacturing a contact lens in accordance with some embodiments of this disclosure.

Reference will now be made in detail to the present embodiments of the invention, examples of which are illustrated in the accompanying drawings. Wherever possible, the same reference numbers are used in the drawings and the description to refer to the same or like parts.

In order to make the description of the present disclosure more detailed and complete, the following illustratively describes implementation aspects and specific embodiments of the present disclosure; however, this is not the only form in which the specific embodiments of the present disclosure are implemented or utilized. The embodiments disclosed below may be combined with or substituted by each other in an advantageous manner, and other embodiments may be added to an embodiment without further recording or description. In the following description, numerous specific details will be described in detail to enable readers to fully understand the following embodiments. However, the embodiments of the present disclosure may be practiced without these specific details.

FIG. 1 is a flow chart illustrating a method of manufacturing a contact lens in accordance with some embodiments of this disclosure. As shown in FIG. 1, the method 10 includes operation 12, operation 14 and operation 16. It is noted that the method depicted in FIG. 1 is merely an example, and is not intended to limit the present invention. Accordingly, additional operations may be performed before, during, and/or after the method depicted in FIG. 1, and some other operations may only be briefly described herein.

Reference is made to FIG. 1. In operation 12 of FIG. 1, a contact lens body is provided. In some embodiments, the contact lens body may be hydrogel contact lens body or silicone hydrogel contact lens body. The contact lens body may be manufactured by suitable method. In some embodiments, the contact lens body includes carboxyl, amine, hydroxyl, or pyrrolidone structure. For example, the contact lens body may have carboxyl group, amine group (e.g., primary, secondary, or tertiary), hydroxyl group, pyrrolidone group, thiol group or combinations thereof. These functional groups on and/or near its surface may be reacted with compounds including a metal ion of the reaction solution subsequently prepared. More specifically, these functional groups may have ability to reduce the metal ion into metal particle.

Figure 2A:
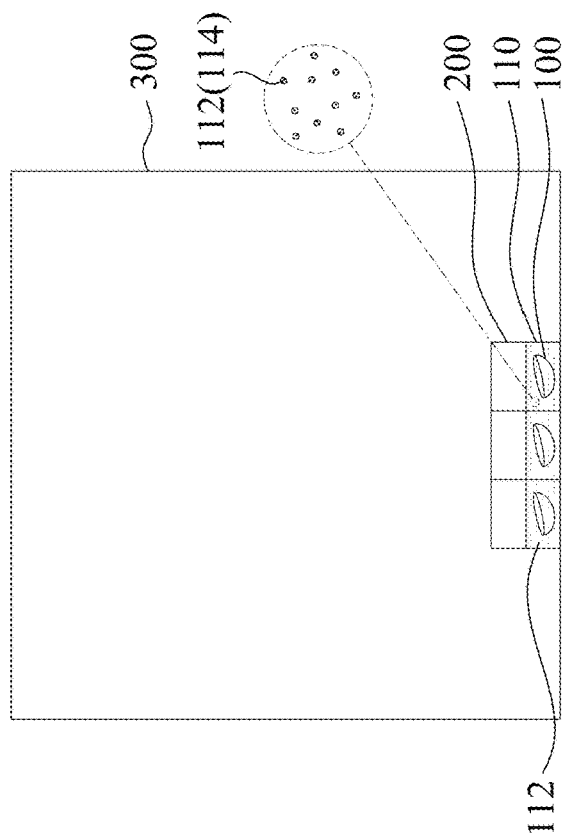
FIG. 2A and FIG. 2B are diagrams illustrating various intermediary stages in the manufacturing of contact lens in accordance with some embodiments of this disclosure.
Figure 2B:
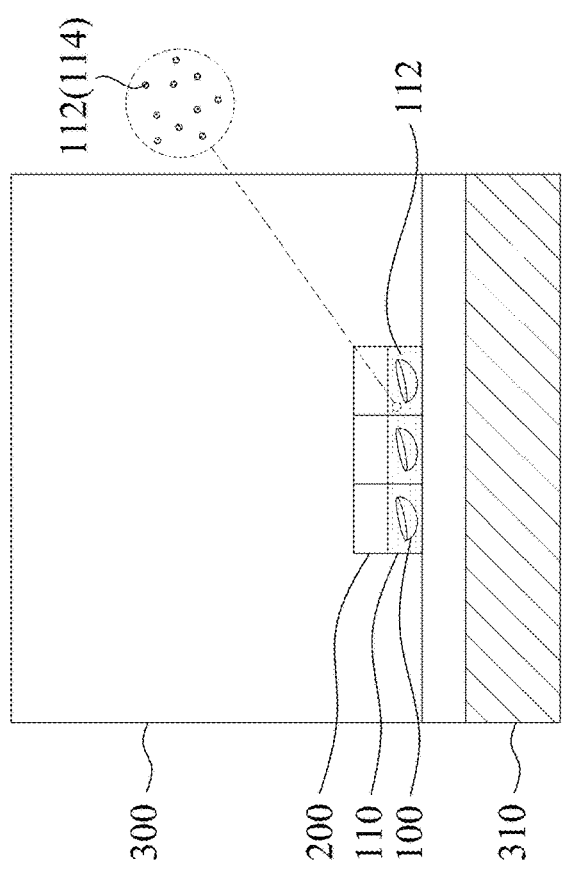

Reference is made to FIG. 1 and FIGS. 2A-2B. In operation 14 of FIG. 1, the contact lens body 100 is immersed with a first reaction solution 110 to form a contact lens having a blue light blocking material 112 covering the contact lens body 100. As shown in FIG. 2A and FIG. 2B, the contact lens body 100 and the first reaction solution 110 may be placed in a container 200, and the contact lens body 100 is completely soaked in the first reaction solution 110. In some embodiments, the container 200 includes polypropylene, or glass.

The first reaction solution 110 may include a solvent, at least one compound including a metal ion, and a plurality of reducing agent for reducing the metal ion into a metal particle 114. In some embodiments, the solvent includes a water soluble solvent. In some examples, the solvent may be DI water.

In some embodiments, the metal ion includes silver ion, gold ion, cobalt ion, manganese ion, nickel ion, copper ion, zinc ion, platinum ion, palladium ion, cadmium ion, indium ion, potassium ion, calcium ion, iron ion, or combinations thereof. In some examples, the compound including metal ion may be silver nitrate.

The plurality of reducing agents at least include a first kind of reducing agent of potassium tert-butoxide. In some embodiments, the reducing agents include at least one functional group including carboxyl group, amine group, thiol group, sulfide group, aldehyde group, hydroxyl group, alkoxide group, N-heterocycle group, pyrrolidone group, borohydride group, or combinations thereof. In some examples, a preferred class of reducing agent includes carboxyl-, amino- or thiol containing chemicals. For example, the reducing agent may be poly(acrylamide-co-acrylic acid), trisodium citrate, sodium tetrahydridoborate or combinations thereof. In some embodiments, the reducing agent has a molecular weight between about 37 to about 1000000 Daltons. In some examples, the reducing agents are functionalized with carboxyl group, acid halide, sulfonic acid group, amine group, amide group, silane group, thiol group, sulfide group, aldehyde group, hydroxyl group, alkoxide group, nitro group, N-heterocycle (morpholine), pyrrolidone, carbohydrate, anhydride group, borohydride, hydrazine, phosphate group, succinimide group, cyano group, epoxide group, ester group, azide group, alkyne or combination thereof.

Figure 5B:
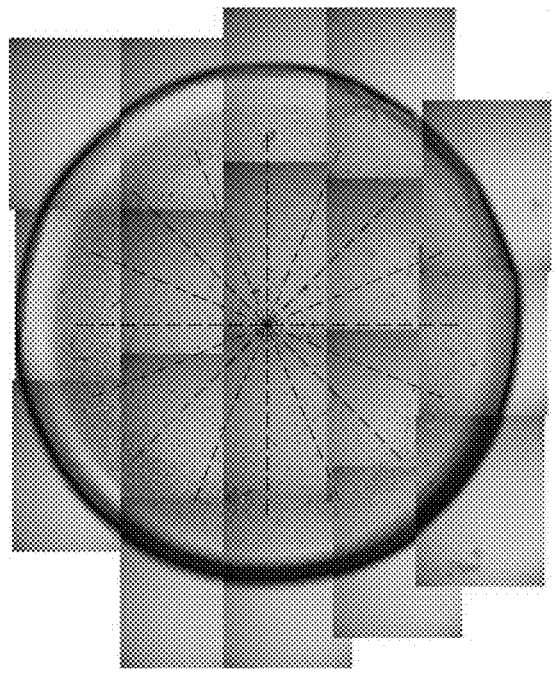
FIG. 5A and FIG. 5B are digital images of contact lens in accordance with some embodiments of this disclosure.
Figure 5A:
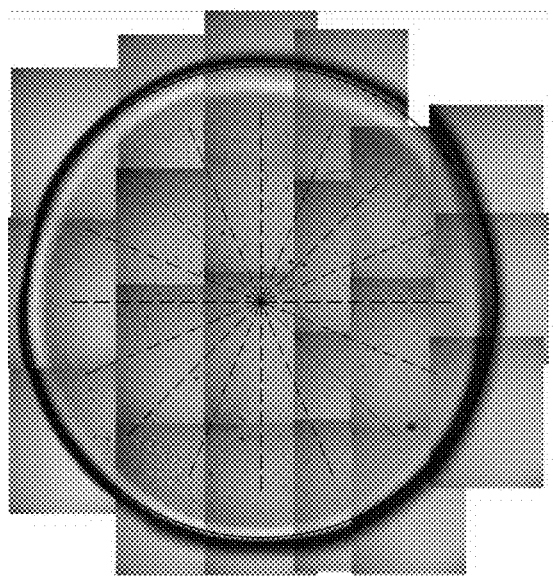

In some embodiments, the plurality of reducing agents include a second kind of reducing agent of glycol-based reducing agent. In some examples, the second kind of reducing agent includes ethylene glycol, propylene glycol, or the like. In specific, the addition of glycol-based reducing agent can further control distribution of metal particles 114. For example, an amount of the metal particles 114 located in a central region of the lens body is more than that of a peripheral region of the lens body. Therefore, a color in the central region of the contact lens may be darker than that of the peripheral region, as shown in FIG. 5A and FIG. 5B.

In some embodiments, the first reaction solution 110 further includes a stabilizing agent. In some embodiments, the stabilizing agent may be any suitable dispersing agent and/or surfactant. The stabilizing agent may interact with the metal particles 114. In some embodiments, the stabilizing agent includes ionic, nonionic, zwitterionic surfactant, ammonium salt, sodium salt, the like or combinations thereof.

In some embodiments, the contact lens body 100 is immersed with all of the components of the first reaction solution 110 in one step. In other embodiments, each component of the first reaction solution 110 may be individually mixed with the contact lens body 100. For example, the contact lens body 100 may be first immersed with a solution including the reducing agent, and the compound including metal ion is then added into the solution. In some examples, the contact lens body 100 is immersed in the first reaction solution 110 at room temperature for about 30 minutes.

In some embodiments, the method further includes performing a heating process at a temperature ranged from 25° C. to 135° C. when immersing the contact lens body 100 with the first reaction solution 110. In some examples, the temperature may be about 25, 30, 35, 40, 45, 50, 55, 60, 65, 70, 75, 80, 85, 90, 95, 100, 105, 110, 115, 120, 125, or 130° C. In some embodiments, the contact lens body 100 is heated at pH from about 3.0 to about 11.0. The container 200 accommodated the contact lens body 100 and the first reaction solution 110 may be placed in an incubator 300 for performing the heating process, as illustrated in FIG. 2A and FIG. 2B. In some embodiments, the incubator 300 includes a water bath incubator (e.g., the incubator 300 shown in FIG. 2A includes water 310 therein), an oven (e.g., the incubator 300 shown in FIG. 2B), or an autoclave sterilizer (not shown). In some embodiments, the heating process includes heating the container 200 in the incubator 300 for about 20 minutes to about 24 hours. In some examples, the container 200 may be heated for 0.5, 1, 2, 3, 4, 5, 6, 7, 8, 9, 10, 11, 12, 13, 14, 15, 16, 17, 18, 19, 20, 21, 22, or 23 hours. The heating process can speed up the modification of the blue light blocking materials 112 covering the contact lens body 100.

Reference is made to FIG. 1. In operation 16 of FIG. 1, the contact lens body is treated with a second reaction solution after immersing the contact lens body with the first reaction solution. In some embodiments, the second reaction solution includes a solvent, at least one compound including a metal ion, at least one reducing agents for reducing the metal ion into a metal particle. In some embodiments, the operation 16 may be omitted.

In some embodiments, the solvent, the at least one compound including the metal ion and at least one reducing agent may be selected from the solvent, the compound and the reducing agent described in the first reaction solution. In some embodiments, the reducing agent includes ascorbic acid. The addition of ascorbic acid can modulate the intensity and frequency of light filtering of the contact lens.

In some embodiments, a heating process is performed treating the contact lens body with the second reaction solution. In some embodiments, the heating process is performed at a temperature ranged from 25° C. to 135° C. In some embodiments, the heating process may be similar to the heating process performed when immersing the contact lens body with the first reaction solution.

The reduction from the reducing agents in the first reaction solution and/or the second reaction solution may be synergistic, addictive and antagonistic effect on the distribution and blue light blocking efficacy of blue light blocking materials 112 throughout contact lens. Further, the relations between the reducing agents in the first reaction solution and/or the second reaction solution and contact lens may also be synergistic, addictive and antagonistic effect on the distribution and blue light blocking efficacy of blue light blocking materials 112 throughout contact lens. That is, the modulations of synergistic, addictive or antagonistic reductions are not limited to be existed in one-single process. These reactions can be repeatedly created for the second or further reductions. In respect of blue-light blocking efficacy of the resultant contact lens, the second reductions can be positive or negative influence on the result of first reduction, resulting in further 0.25- to 4-fold increase or decrease of blue-light blocking efficacy of contact lens, as compared with that processed with only one-single modification. In particular, for blue-light blocking at 380-480 nm, the multiple reduction factors (such as reducing agents, stabilizing agents or contact lens itself) in synergistic, addictive or antagonistic relations can alter 0.1- to 10-fold increase or decrease of blue-light blocking efficacy of contact lens, as compared to that with relatively less reduction sources, leading to result in overall about 5% to about 95% of blue light blocking efficacy.

In some embodiments, the method further includes extracting the contact lens with an extraction solution. The extraction process may be performed after immersing the contact lens body with the first reaction solution or treating the contact lens with the second reaction solution.

In some embodiments, when the contact lens body is silicone hydrogel contact lens, the extraction solution may include isopropyl alcohol. In other embodiments, when the contact lens body is hydrogel contact lens, the extraction solution may be borate buffered saline. In some embodiments, the method further includes performing a hydration process after performing the extraction process.

The method further includes performing a sterilization process. In some embodiments, the contact lens is packaged with a package solution before performing the sterilization process. In some embodiments, the package solution includes borate buffer saline, ascorbic acid and hydrophilic molecule. The addition of the ascorbic acid is beneficial to enhance blue-light blocking efficacy of the contact lens. In some embodiments, the hydrophilic molecule includes hyaluronic acid, mini hyaluronic acid, carboxymethyl cellulose, hydroxypropyl methylcellulose, surfactant, or combinations thereof.

Another aspect of the present invention provides a contact lens. The contact lens includes a contact lens body and a blue light blocking material covering the contact lens body, in which the blue light blocking material includes a plurality of metal particles dispersed on the contact lens body.

The contact lens body includes a central region and a peripheral region surrounding the center region. In some embodiments, the contact lens body includes a hydrogel contact lens or a silicone hydrogel contact lens. In some embodiments, the contact lens body includes carboxyl, amine, hydroxyl, or pyrrolidone structure. For example, the contact lens body may have carboxyl group, amine group (e.g., primary, secondary, or tertiary), hydroxyl group, pyrrolidone group, thiol group or combination thereof.

The plurality of metal particles in the central region are more than in the peripheral region. In some embodiments, the plurality of metal particles comprise silver, gold, cobalt, manganese, nickel, copper, zinc, platinum, palladium, cadmium, indium, potassium, calcium, iron, or combinations thereof. In some embodiments, the plurality of metal particles have a diameter of about 1-10000 nm. In some embodiments, the diameter of the metal particle preferably from 1 to 1000 nm, or more preferably from 1 to 200 nm. In some embodiments, the metal particle may be particles separated from each other, cluster or combinations thereof. In some embodiments, the contact lens includes about 1 wt % to about 20 wt % blue light blocking material based on a total weight of the contact lens. With only a few amount of the blue light blocking material, the contact lens of this invention can achieve good blue light blocking efficiency.

In some embodiments, the contact lens exhibits tunable plasmonic resonances at visible light ranged from 380-800 nm. In some embodiments, the contact lens exhibits tunable plasmonic resonances at visible light ranged from 380-500 nm. In some embodiments, the contact lens exhibits tunable plasmonic resonances at visible light ranged from 380-450 nm. In some embodiments, the contact lens inhibits about 5% to about 99% of blue light at wavelength ranged within 380 nm to about 480 nm. In some embodiments, the contact lens has an averaged water contact angle of about 30-70 degrees. In some embodiments, the contact lens has an averaged hysteresis of about 0.1-35 degrees. The contact lens of the present disclosure which endowed with further treatment by additions of blue light blocking materials shows improved surface properties including contact angle, water break-up time and long-term protein depositions, without affecting the intrinsic properties of pristine contact lens such as physical diameter, water content, oxygen permeability and modulus.

Example 1: Preparation of a Hydrogel Contact Lens 2-hydroxyethyl methacrylate (HEMA) and methacrylic acid were mixed with cross-linkers ethyleneglycol dimethacrylate and trihydroxymethylpropyl trimethylacrylate to form a mixture. The mixture was used to dissolve the rest of powders including reactive blue dye, Bis(2,4,6-trimethylbenzoyl)-phenylphosphineoxide (IRGACURE 819) and 2-[2-Hydroxy-5-[2-(methacryloyloxy)ethyl]phenyl]-2H-benzotriazole under a magnetic stir bar stirring until all the powders were dissolved in the mixture.

The as-prepared reaction mixture was added and cast into front- and back-curve molds made from polypropylene and irradiated at 5 mW/cm$^2$ for 20 minutes in air. The resultant hydrogel contact lens in dry state was released and then extracted by borate buffered saline twice under 60° C. for 1 hour. The resultant hydrogel contact lens was placed in blister package filled with borate buffered saline and sterilized. The resultant hydrogel contact lens had a water content of about 58%, oxygen permeability of about 20-25 DK, modulus of about 0.3-0.4, and blue-light blocking efficacy of about 1-3%.

Example 2: Preparation of a Silicone Hydrogel Contact Lens

Hydrophilic component of N-vinyl pyrrolidone (NVP), 2-hydroxyethyl methacrylate (HEMA), methacrylic acid and N,N-dimethylaniline (DMA) were first mixed with silicone material (3-Methacryloxy-2-hydroxypropoxy) propylbis (trimethylsiloxy)methylsilane, and then mixed with cross-linkers ethyleneglycol dimethacrylate and triallyl-s-triazine-2,4,6(1H,3H,5H)-trione. Finally, the mixture was used to dissolve the rest of powders including reactive blue dye, Bis(2,4,6-trimethylbenzoyl)-phenylphosphineoxide (IRGACURE 819) and 2-[2-hydroxy-5-[2-(methacryloyloxy)ethyl]phenyl]-2H-benzotriazole under a magnetic stir bar stirring until all the powders were dissolved in the mixture.

The as-prepared reaction mixture was added and cast into front- and back-curve molds made from polypropylene and irradiated at 5 mW/cm$^2$ for 30 minutes in air. The resultant silicone hydrogel contact lens in dry state was released. Subsequently, the dry silicone hydrogel contact lenses were extracted by isopropyl alcohol (IPA) under a serial processes which were followed with incubation in 9217 surfactant, 50 v/v %, 100 v/v %, 100 v/v %, 75 v/v %, 50 v/v % and 25 v/v % of IPA and finally balanced in borate buffered saline. The condition for each step was 30 minutes except the extraction by 100 v/v % of IPA is 1 hour. Each of incubation was processed for 30 minutes at 50° C. and balanced in borate buffer saline for 60 minutes at 25° C. Further surface coating can be processed if it was required. The hydrated silicone contact lens was placed in blister package filled with borate buffered saline and sterilized. The resultant contact lens had a water content of 50%, oxygen permeability of about 120 DK, modulus of 0.6-0.7, and blue-light blocking efficacy of about 5-7%.

To further understand the detail of the reaction between contact lens and blue light blocking materials, the same reaction mixture was prepared except for replacing methacrylic acid with the same amount of 2-hydroxyethyl methacrylate. The subsequent manufacturing process was same as described above. The resultant silicone hydrogel contact lens without methacrylic acid addition showed a water content of about 46-50%, oxygen permeability of about 120 DK, modulus of about 0.6-0.7 and blue-light blocking efficacy of about 8-10%.

Example 3

A stock solution was prepared through DI water to dissolve poly(acrylamide-co-acrylic acid) and trisodium citrate powders, which the final concentration was 0.5 mg/ml and 25 mM, respectively. After that, 600 μL of the stock solution with another 300 μL of DI water were added into a container made from polypropylene. Then, the dry-released of silicone hydrogel contact lens was placed into the container and immersed into the solution. Subsequently, 300 μL of 5 mM, 10 mM, 15 mM, 20 mM and 40 mM silver nitrate solution was added into the container and mixed with the solution. After about 3 minutes, 600 μL of DI water or 0.01 M potassium tert-butoxide (PTB) solution was added into the container and mixed with the solution. The resultant mixture (i.e. reaction solution) with addition of PTB was brown and the one without PTB was transparent.

Next, silicone hydrogel contact lens in each of container was incubated with the mixture for 30 minutes at room temperature. Then, the container was heated in an oven for 2 hours at 45° C. After reaction, the resultant contact lenses were washed with DI water twice and extracted by isopropyl alcohol (IPA) under a serial processes which were followed with incubation in 50 v/v %, 100 v/v %, 100 v/v %, 75 v/v %, 50 v/v % and 25 v/v % of IPA. Each of incubation was processed for 30 minutes at 50° C. and balanced in borate buffer saline for 60 minutes at 25° C.

Finally, to enhance the hydrophilic property of contact lens surface, a surface modification using layer-by-layer techniques was further performed. Contact lens was first placed in a 0.05 wt % aqueous solution of copolymer (glyceryl methacrylate and vinyl-functionalized acrylic acid) at pH 8.5, 45° C. for 1 h. Then, contact lens was placed in a 0.05 wt % aqueous solution of copolymer (acrylamide and 2-aminoethyl methacrylate hydrochloride) at pH 9.5, 45° C. for an hour. To enhance the coverage and integrity of surface modification, contact lens was again completed another cycle for two co-polymers coating. All the contact lenses were finally placed into borate buffered saline before any further experiments.

The reactions under various conditions were summarized in Table 1. As shown in Table 1, the resultant contact lenses with additionally reduced by PTB significantly enhanced about 2 to 3 fold of blue-light blocking efficacy than those without PTB incorporation under a serial concentration of silver ions. This indicated that the reduction by effective functional groups from additional chemicals (poly(acrylamide-co-acrylic acid) and trisodium citrate) and contact lens itself (pyrrolidone or carboxyl group), as well as reducing agent PTB can be cooperative. Thus, the one with additional PTB incorporation led to the higher blue-light blocking efficacy.

TABLE 1

| Ag Concentration | Blue-light blocking efficacy (%) | |
| --- | --- | --- |
| (mM) | with PTB | without PTB |
| 40 | 63.4% | 37.2% |
| 20 | 65.2% | 34.6% |
| 15 | 66.7% | 21.3% |
| 10 | 63.3% | 21.6% |
| 5 | 68.5% | 22.5% |

Example 4

To further illustrated the addictive and synergistic reduction through additional incorporation of reducing agent PTB, dried silicone hydrogel contact lens and hydrogel contact lens were followed with the protocol described in Example 3 under incorporation with a serial concentrations of PTB ranged within 2.5 to 50 mM. Meanwhile, unsterilized pristine hydrogel gel contact lens and silicone hydrogel contact lens were compliance with the protocols illustrated in Example 1 and Example 2. The resultant contact lenses were first immersed in surfactant 9217 containing 0.1 wt % of polyethylene glycol 200, 0.01 wt % of tween 80, and 2 wt % of 2-(Methacryloyloxy)ethyl 2-(trimethylammonio)ethyl phosphate-n-butylmethacrylate copolymer for 5 minutes and then transferred to glass vials. Each glass vial contained 3 ml of borate buffer (0.5 g of sodium tetraborate decahydrate and 4.7 g of boric acid in 1 L of DI water) with 150 mM sodium chloride. Finally, all the sealed samples were sealed and sterilized at 121° C. for 30 minutes.

The results were summarized in Table 2. In Table 2, SiHy represented silicone hydrogel contact lens, and Hy represented Hydrogel contact lens. As shown in Table 2. It indicated that the enhanced efficacy of blue-light blocking was concentration-dependent on PTB. The higher concentration of potassium tert-butoxide (PTB) was more effective in helping metal reduction, resulting in the higher efficacy of blue-light blocking. Also, Table 2 showed that the reduction through PTB and functional groups from additional chemicals (PAA and trisodium citrate) was more efficient in reaction on silicone hydrogel contact lens than that of hydrogel contact lens, resulting in the higher efficacy of blue-light blocking. It can be explained that silicone hydrogel contact lens contained the higher amount of reactive-functional groups (about 30 wt % of pyrrolidone per contact lens) than that of hydrogel contact lens (about 2 wt % of carboxyl group per contact lens), which contributed a portion of benefits for metal reduction.

Generally, commercial contact lenses claimed with blue-light blocking only reach to 10%-20% efficacy of blue light filtering. Therefore, the group of hydrogel contact lens reacted with 5 mM potassium tert-butoxide (PTB), exhibiting 11.6% of blue-light blocking was served as a control. The blue-light blocking efficacy was then divided by 11.6% to obtain each corresponding ratio. When increasing PTB concentration from 5 mM to 7.5 mM and 10 mM, the increased ratio was only 1.16 and 2.26. As replacing silicone hydrogel contact lens with hydrogel contact lens under the same reaction (i.e., 5 mM PTB), the ratio was 1.29. However, when applying silicone hydrogel contact lens under 7.5 mM and 10 mM PTB treatment, the ratios reached to 3.14 and 3.73, suggesting the synergistic effect between PTB and the reducing-functional groups from contact lens.

TABLE 2

| | Blue-light blocking efficacy (%) | | | |
| --- | --- | --- | --- | --- |
| PTB (mM) | SiHy | Ratio | Hy | Ratio |
| 50 | 89.5% | 7.72 | 66.9% | 5.77 |
| 25 | 60.6% | 5.22 | 54.1% | 4.67 |
| 10 | 43.3% | 3.73 | 26.2% | 2.26 |
| 7.5 | 36.4% | 3.14 | 13.5% | 1.16 |
| 5 | 15.0% | 1.29 | 11.6% | 1 |
| 2.5 | 8.6% | 0.74 | 3.2% | 0.28 |
| Control | 8.7% | 0.75 | 2.5% | 0.22 |

Example 5

The relations for addictive, synergistic or antagonistic reduction by PTB, functional groups from additional chemicals (PAA and trisodium citrate) and contact lens itself (pyrrolidone or carboxyl group) were further demonstrated in this example. Sample preparations (silicone hydrogel contact lens) were followed with the same protocols as demonstrated in Example 4, except that the concentrations of trisodium citrate and poly(acrylamide-co-acrylic acid) were adjusted, which were ranged from 0 to 20 mg/mL and 0 to 400 mM, respectively.

Table 3 summarized the results from each corresponding conditions. Generally, both trisodium citrate and poly(acrylamide-co-acrylic acid) (PAA) were beneficial in metal reduction, contributing the portion of enhanced efficacy of blue-light blocking (%). However, when the concentration of trisodium citrate was increasingly higher, and PAA reached to 20 mg/ml, the blue-light blocking efficacy for contributions by PAA and trisodium citrate was decreased. The result possibly because the PAA under high concentration became less soluble in water or competitive reactions between trisodium citrate and PAA. Notably, when replaced both trisodium citrate and PAA with DI water (i.e., 0 mg/mL PAA and 0 mM trisodium citrate), the reaction for metal reduction for blue-light blocking through only PTB and contact lens itself (pyrrolidone or carboxyl group) was barely reacted, which proved the existence of synergistic reduction cooperated by PTB and the functional groups from contact lens itself (illustrated in Table 2) required additions of chemicals (PAA and trisodium citrate).

TABLE 3

| PAA (mg/mL) | Trisodium citrate (mM) | | | | |
|---|---|---|---|---|---|
| | 400 | 100 | 25 | 5 | 0 |
| 20 | 43.0% | 35.2% | 35.4% | 34.6% | 26.0% |
| 0.5 | 65.4% | 54.1% | 42.5% | 24.8% | 14.0% |
| 0 | 65.4% | 49.9% | 34.7% | 18.6% | 11.3% |

Example 6

Samples followed with the protocols illustrated in Example 4 and Example 5 were prepared. Notably, in Example 6, the extraction process was followed with the order: 9217 surfactant, 50 v/v %, 100 v/v %, 100 v/v %, 75 v/v %, 50 v/v % and 25 v/v % of IPA, and finally balanced in borate buffered saline before further surface coating processes. The condition for each step was 30 minutes except the extraction by 100 v/v % of IPA was 1 hour. The resultant contact lenses were sealed by blister package in polypropylene cup with borate buffered saline and sterilized at 121° C. for 30 minutes.

All the data was summarized in Table 4, showing that the modification of blue-light blocking material does not affect the physical, chemical or external surface modification of contact lens as compared with the pristine contact lens.

TABLE 4

| Sample | Control | #1 | #2 | #3 | #4 |
|---|---|---|---|---|---|
| Experimental conditions | | | | | |
| PAA (mg/mL) | 0 | 0.5 | 0.5 | 20 | 0.5 |
| Trisodium citrate (mM) | 0 | 100 | 25 | 100 | 5 |
| Potassium tert-butoxide (M) | 0 | 0 | 0.01 | 0.01 | 0.01 |
| Contact lens properties | | | | | |
| Blue-light blocking efficacy (%) | 5.4% | 21.3% | 30.5% | 34.2% | 9.1% |
| Water content (±2%) | 50.2% | 51.3% | 51.1% | 51.2% | 49.6% |
| Diameter (±0.02 mm) | 14.14 | 14.24 | 14.20 | 14.20 | 14.06 |
| Base curve (±0.2 mm) | 8.74 | 8.77 | 8.81 | 8.81 | 8.6 |
| Central thickness (±0.01 mm) | 0.081 | 0.081 | 0.083 | 0.083 | 0.076 |
| Power (±0.25D) | −2.92 | −2.87 | −2.98 | −2.88 | −2.98 |
| Modulus | 0.64 | 0.65 | 0.62 | 0.58 | 0.55 |
| Elongation (%) | 207% | 215% | 264% | 247% | 195% |
| Dk (ml O2/ml × mm Hg, ±20%) | 96.4 | 99.6 | 107.8 | 106.3 | 88 |

TABLE 4-continued

| Sample | Control | #1 | #2 | #3 | #4 |
|---|---|---|---|---|---|
| Dynamic contact angle, advancing angle (degree) | 31.9° | 31.4° | 31.2° | 30.9° | 31.0° |
| Dynamic contact angle, hysteresis (degree) | 1.2° | 0.8° | 1.3° | 0.9° | 0.8° |
| Break-up time (s) | 60.0 | 55.2 | 62.0 | 68.0 | 60.8 |
| Sudan black (Transmittance, T %) | 80.9% | 85% | 84.4% | 85.8% | 84.4% |

Example 7

The behaviors of sample #1 to sample #3 and control contact lens prepared in Example 6 were estimated, mimicked in tear protein-rich environment. The protein mixture contains 0.3 g/L of Immunoglobulin A, 1.5 g/L of lactoferrin, 1 g/L of albumin and 2.5 g/L of lysozyme in 1 L of phosphate buffered saline (8 g of sodium chloride, 0.2 g of potassium chloride, 1.78 g of sodium phosphate and 0.27 potassium dihydrogen phosphate) with pH 7.4 and osmotic pressure of 310 mCSm/kg.

Protein deposits examination was then performed. Each of contact lens immersed in 3 ml of protein mixture, phosphate buffered saline as well as the pristine protein mixtures (without contact lens) were placed in glass vials and sealed. Then, all the glass vials were stored in an oven at 37° C. for at least 12 hours in each day. The supernatants from each group (sample #1 to sample #3 and control contact lens) that were immersed in protein mixture and phosphate buffered saline were collected every day. Pristine protein mixture was used to set up a calibration curve through diluting a serial concentration of the protein mixture with 4, 8, 16, 32, 64, 128, and 256 fold. To minimize the noise signal, in which it was not from the protein mixture, the supernatant from each group that was incubated in phosphate buffered saline was applied for dilution buffer. UV absorption was measured and analyzed at 280 nm to determine the protein absorption in each sample. Notably, at day 1, day 5, day 6, day 7, day 12 and day 13, all the samples after collection of the supernatants were washed with phosphate buffered saline twice and replaced with the fresh protein mixture.

Figure 3:
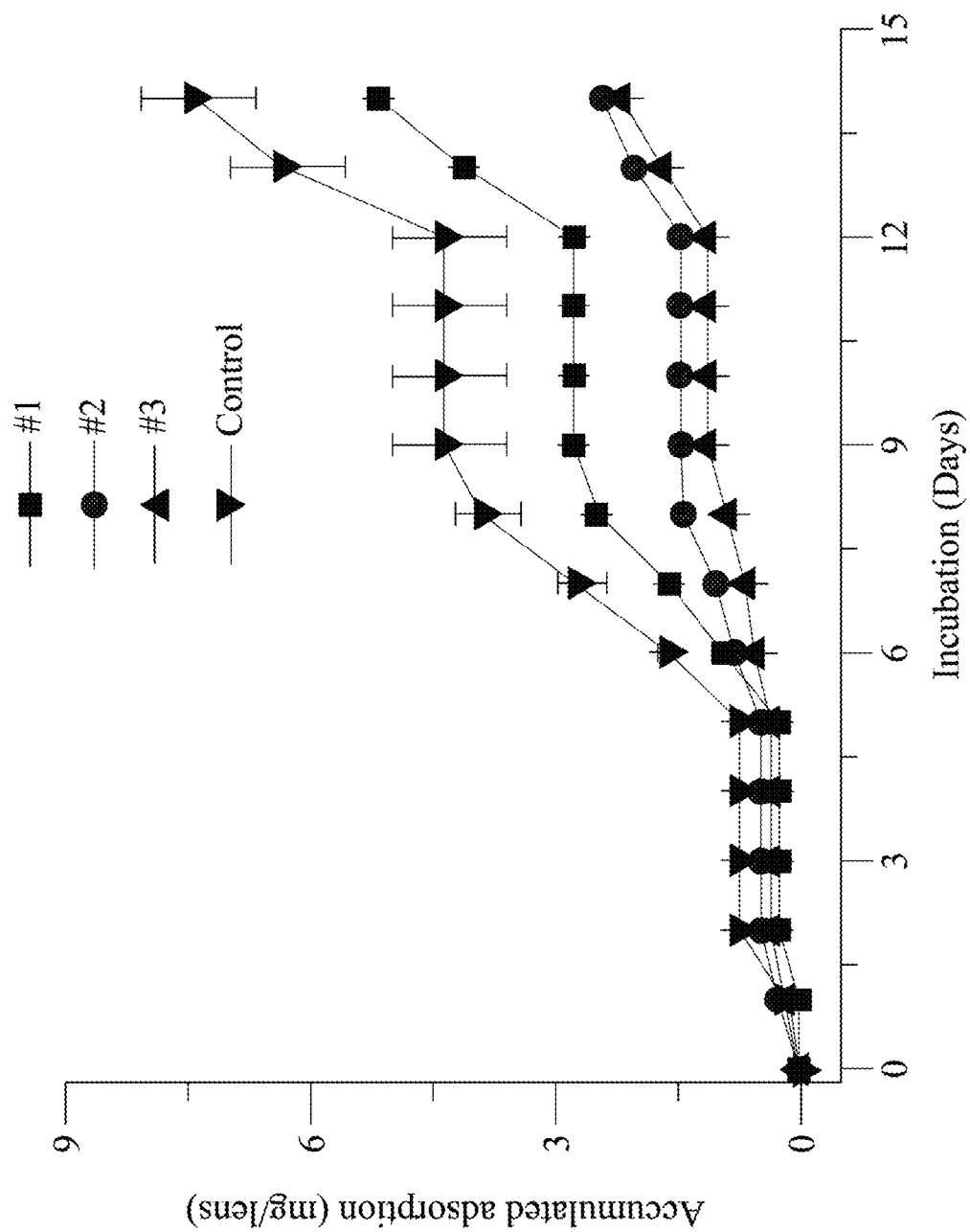
FIG. 3 is a graph showing relationship between protein accumulated adsorption and incubation time of contact lenses in accordance with some embodiments of this disclosure.

FIG. 3 is a graph showing relationship between protein accumulated adsorption and incubation time of contact lenses. As shown in FIG. 3, as compared with control contact lens, sample #1 to sample #3 with additionally blue-light blocking material display less accumulated tear protein absorption. Sample #2 and sample #3 with PTB treatment were more efficient in reduced tear protein absorption than sample #1 without PTB treatment.

Figure 4:
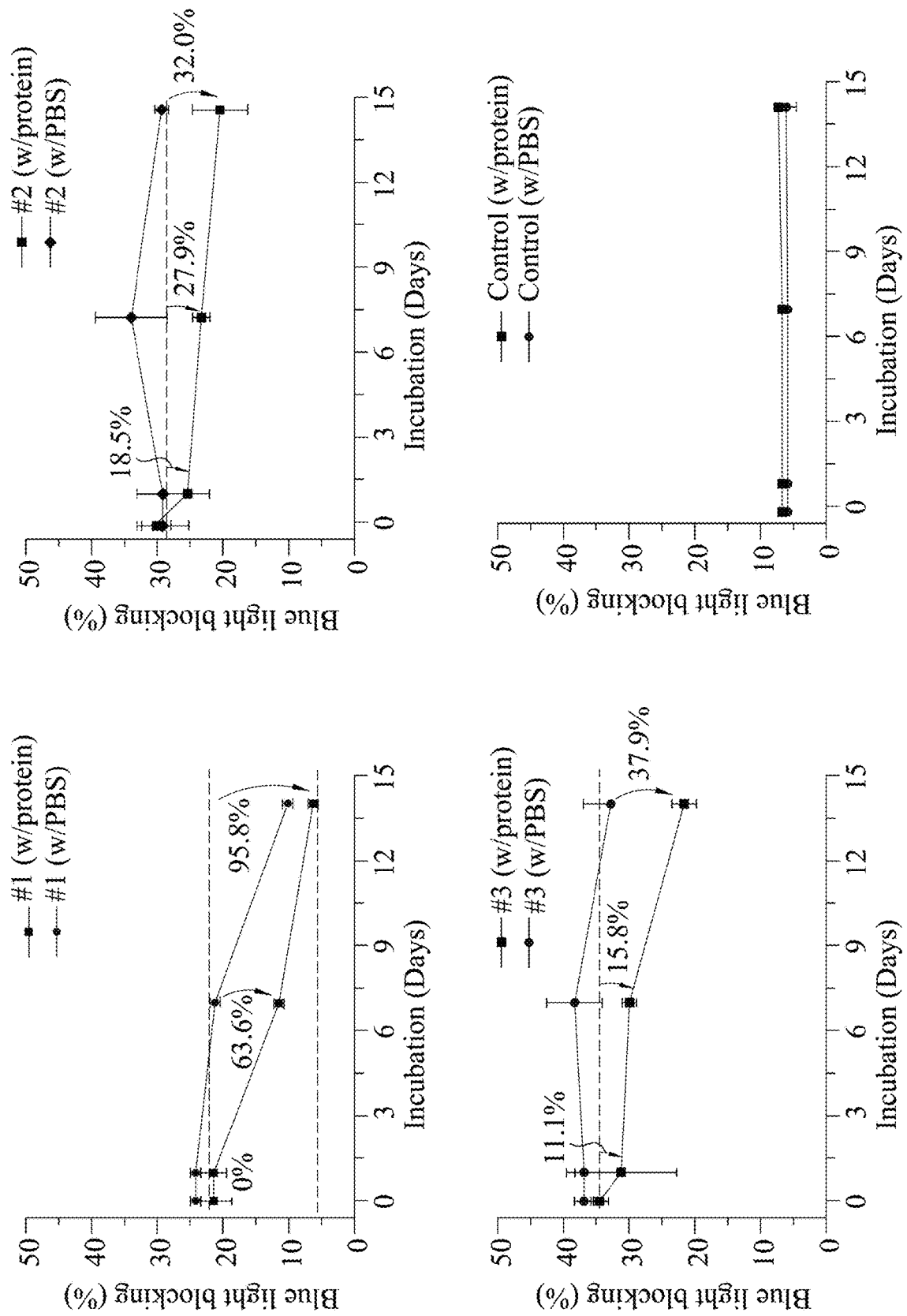
FIG. 4 is a series of graph showing relationship between blue light blocking efficacy and incubation time of contact lenses in accordance with some embodiments of this disclosure.

FIG. 4 is a series of graph showing relationship between blue light blocking efficacy and incubation time of contact lenses. As shown in FIG. 4, sample #2 and sample #3 maintained the most stable ability in blue-light blocking during the 14-days tear protein incubation. In contrast, sample #1 without PTB treatment shows less stable in maintenance on blue-light blocking possibly due to more portions of replacement of blue-light blocking materials by environmental tear proteins. It indicated that synergistic reduction improved by PTB on blue-light blocking materials not only affected the stability and intensity of blue-light blocking efficacy, but also the improved stability led to reduce environmental protein replacement in long term treatment. since most of the commercial contact lens with blue-light blocking was only used for daily wear, the contact lens of the present disclosure, which maintained stable blue-light blocking efficacy and prevented protein depositions for a prolonged wearing was particularly promising.

Example 8

A mixed solution containing 0.5 mg/ml of PAA and 25 mM of trisodium citrate was first prepared. 600 μL of the solution was added into a container made from polypropylene. Then, 300 μL of ethylene glycol or propylene glycol was mixed with the solution. After 1 minute, dry-released hydrogel contact lens was placed into the container and immersed into the solution. After that, 300 μL of 0.02 M silver nitrate along with 0.01 M potassium tert-butoxide (PTB) solution was added and mixed with the solution. After 30 minutes incubation at room temperature, contact lenses were heated at 55° C. for 2 hours for metal reduction and depositions. After that, the contact lenses were washed with DI water twice, balanced in borate buffered saline at room temperature for 1 hour. Finally, the resultant contact lenses with 3 ml of borate buffered saline were sealed in glass vials and sterilized at 121° C. for 30 minutes.

FIG. 5A and FIG. 5B are digital images of contact lens. As shown in FIG. 5A and FIG. 5B, with additional ethylene glycol and propylene glycol addition, color distribution of contact lenses were found. Metal particle depositions were localized more within central region than peripheral region. Glycol-based chemicals were found to possess ability to control metal particle depositions on contact lens. In this example, glycol-based reducing agent together with additional chemicals (e.g., PAA and trisodium citrate) and PTB control centralizes metal depositions on central region.

Figure 6B:
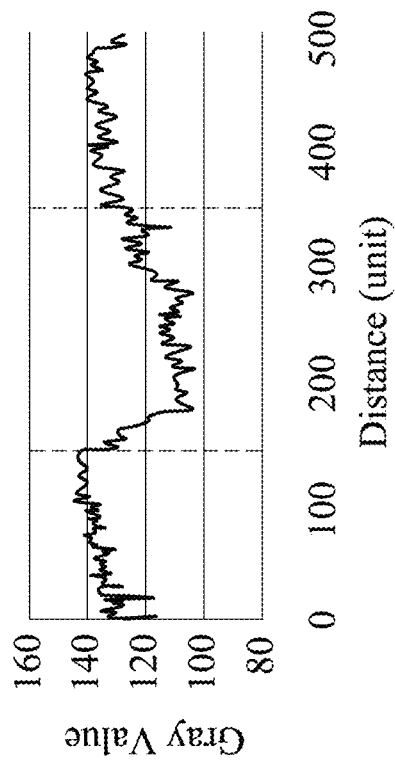
FIG. 6A and FIG. 6B are graphs showing gray value corresponding to the contact lens of FIG. 5A and FIG. 5B.
Figure 6A:
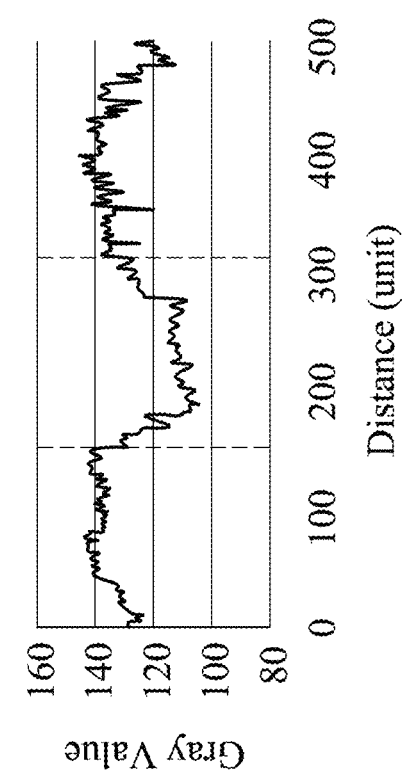
Figure 7A:
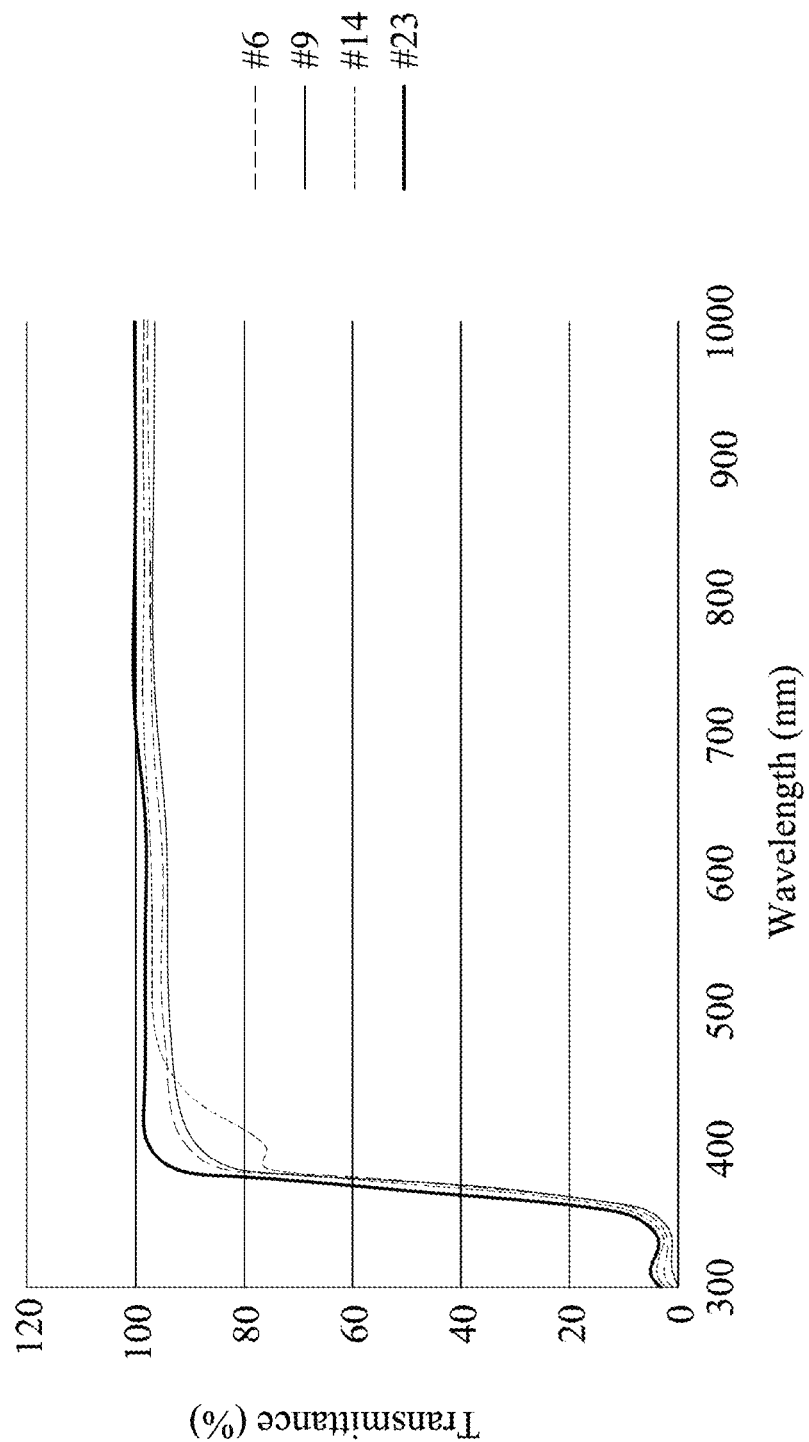
FIGS. 7A-7D respectively shows the UV-Vis spectrum of contact lenses in accordance with some embodiments of this disclosure.
Figure 7B:
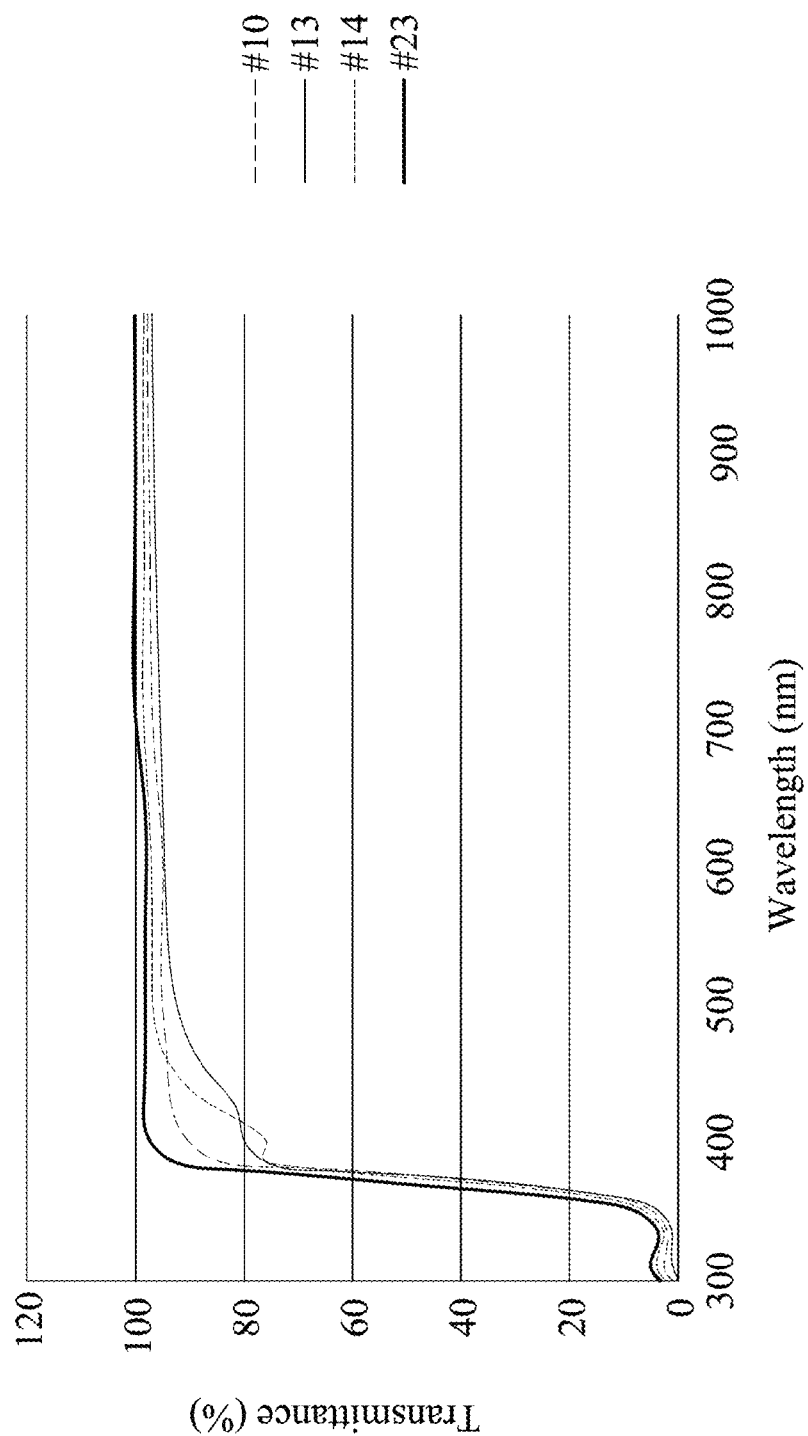
Figure 7C:
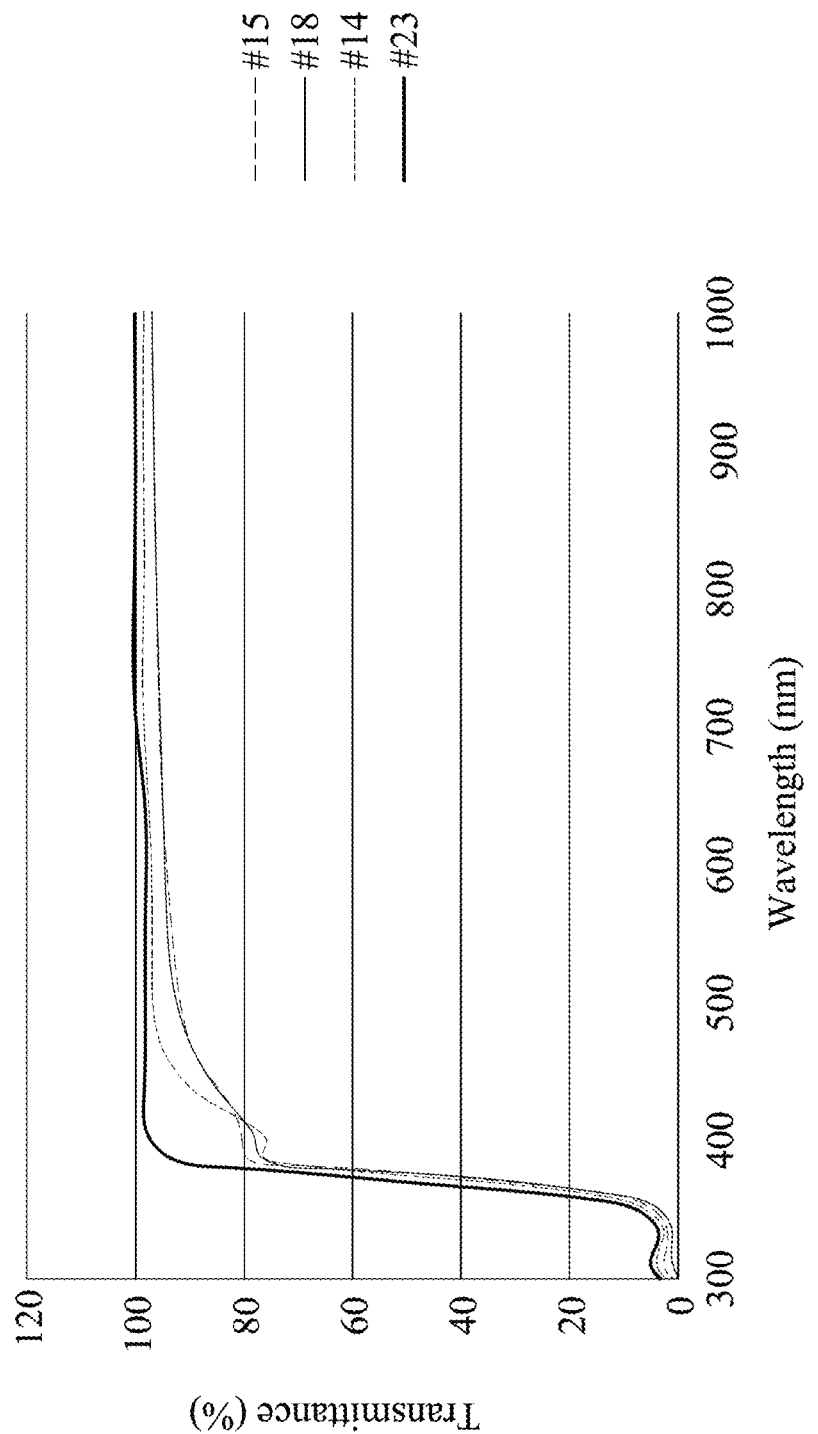
Figure 7D:
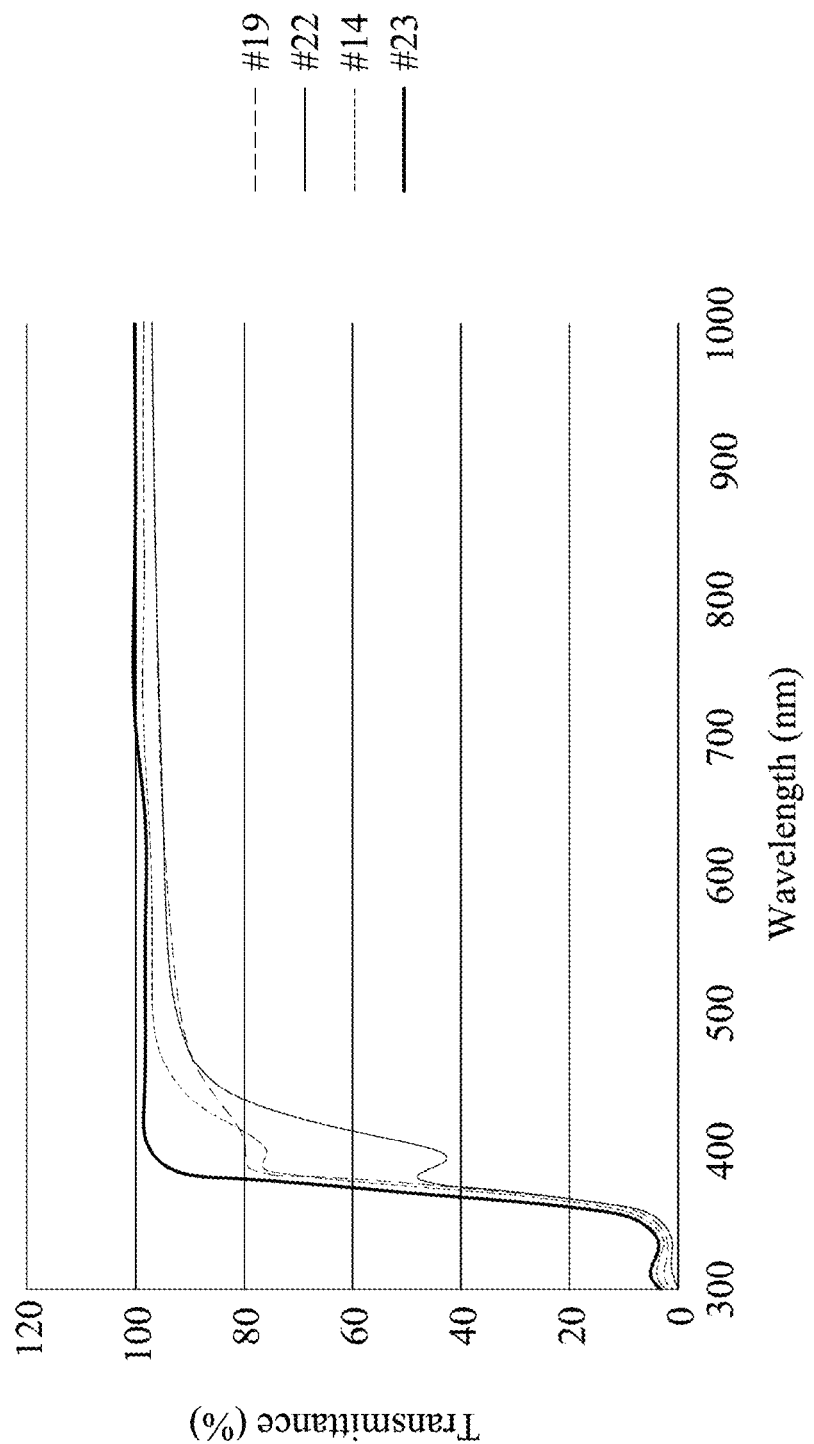

This appearance may also demonstrated in FIG. 6A and FIG. 6B, which were graphs showing gray value corresponding to the contact lens of FIG. 5A and FIG. 5B. The gray value of the contact lenses of FIG. 5A and FIG. 5B were analyzed using Image J software. The lighter the color of the contact lens, the closer it is to white, resulting in the higher gray value. Using bright-field microscopy scale bar 1 mm as the reference to draw eight straight lines with a length of 10 mm shown in FIG. 5A and FIG. 5B. Calculating the gray value of the region of each straight line, and the average value was shown in FIG. 6A and FIG. 6B. As shown in FIG. 6A and FIG. 6B, distance 500 unit equaled to 10 mm. The gray value of a central region (e.g., distance of 150-350) of the contact lens was lower than that of a peripheral region (e.g., distance of 0-150 and distance of 350-500) of the contact lens. It demonstrated that the color in the central region of the contact lens was darker then the peripheral region and metal particle depositions were localized more within the central region than the peripheral region.

Example 9

150 ml of mixture was first prepared by using DI water to dissolve poly(acrylamide-co-acrylic acid) and trisodium citrate with the final concentration 0.5 mg/ml and 0.025 M, respectively. Sonication was allowed in order to speed up the dissolution process. After that, 0.2 wt %, 37.5 mL of polyvinylpyrrolidone (PVP), 29 kDa and 37.5 mL of borate buffer (without sodium chloride) were added. The mixture was stirred for another 5 minutes. Then, 75 ml of silver nitrate was added slowly under stirring. Finally, 0.01 M potassium tert-butoxide (PTB) solution was added to mix with the solution, and stirred for another 1 hour. The final concentration of silver nitrate was 15 ppm. Notably, the resultant reaction solution was transparent.

Next, 1.2 ml of the resultant mixture per container was prepared and each container was placed with 1 dried hydrogel contact lens. After all the contact lenses in dried state were immersed in the mixture for at least 30 minutes, they were heated by water steamed for 2 hours at 85° C. Then, all the contact lenses were washed with DI water twice.

In Table 5 sample #14, the contact lenses with only 1-time modification of blue-light blocking were served as a control group. Notably, sample #23 was the pristine hydrogel contact lens without any modification of blue-light blocking materials and was served as a negative control group. The resultant contact lenses in sample #14 along with dried hydrogel contact lenses (sample #23) were extracted with borate buffered saline 3 times for 30 minutes at 60° C. As for the other two groups, #6 to #13 and #15 to #22, contact lenses after first modification (filled with seed) were processed for the second modification (growth) protocol.

Before further second modification, two kinds of growth solutions were prepared. The first kind of growth solution (sample #6-13) was obtained by either mixing 0.6 ml of 7.5 ppm silver nitrate with 25 mM trisodium citrate, 2.4 ml of DI water and 0.6 ml of ascorbic acid ranged within 0.5 mM to 4 mM (sample #6-9); or mixing 1.8 ml of 22.5 ppm of silver nitrate with 25 mM trisodium citrate, 0.6 ml of DI water and 0.6 ml of ascorbic acid ranged within 0.5 mM to 4 mM (sample #10-13).

The second kind of growth solution (sample #15-22) was obtained by mixing 0.6 ml of 7.5 ppm silver mixture with 25 mM trisodium citrate, 2.4 ml of DI water and 0.6 ml of ascorbic acid ranged within 0.5 mM to 4 mM (sample #15-18); or mixing 1.8 ml of 22.5 ppm of silver mixture with 25 mM trisodium citrate, 0.6 ml of DI water and 0.6 ml of ascorbic acid ranged within 0.5 mM to 4 mM (sample #19-22). The silver mixture was referred to the resultant reaction solution described above in the first paragraph of Example 9, except the concentration of silver nitrate was adjusted to the target concentrations, 7.5 and 22.5 ppm.

For the group of samples #6 to #13 and group of samples #15 to #22 of contact lenses, they were immersed in 3 ml of as-prepared growth solutions in glass vials and heated by water bath for another 2 hours at 85° C. After that, the resultant contact lenses were extracted with borate buffered saline 3 times for 30 minutes at 60° C. All the contact lenses were sealed in glass vials filled with 3 ml of borate buffered saline and sterilized at 121° C. for 30 minutes prior to any other experiments.

The results were summarized in Table 5 and FIG. 7A to FIG. 7D. In Table 5, AA represented ascorbic acid and BLB represented blue-light blocking efficacy. As the concentration of reducing agent, ascorbic acid was increased, the corresponding blue-light blocking efficacies along with both additional two growth solutions were not enhanced, or even decreased. This suggests that ascorbic acid in this case was served as antagonistic effect against the other reducing elements, leading to be detrimental in blue-light blocking. This conclusion can be approved from the fact that blue-light blocking efficacy was dramatically increased only when the second growth solution with high concentration of silver (13.5 ppm) and less ascorbic acid (0.5 mM) was applied. As the elements capable of reduction, such as PAA, PVP and PTB accounted the higher portion of the reaction, they minimize the effect from ascorbic acid, resulting in the higher blue-light blocking efficacy.

FIG. 6A and FIG. 6B respectively shows the UV-Vis spectrum of contact lenses in accordance with some embodiments of this disclosure. Please refer to FIG. 6A and FIG. 6B. The average and standard deviation of transmittance between 380 nm to 1000 nm in group #23 was 99.25% and 1.73%. The transmittance less than 380 nm was not counted due to the influence by UV-absorber. The average minus 2 fold of standard deviation, 95.79% was served as the threshold (99.25%−2×1.73%=95.79%), indicating that the transmittance lower than 95.79% was result from blue-light blocking materials. In the group of #14, only 1-time modification of blue-light blocking materials affects the range only within 380-474 nm. However, with the second modification, the influence range can be spread from 380 nm to 675 nm depending on each condition, resulting in different refractive colors. This behavior indicates that ascorbic acid in this example was capable of modulating the intensity and frequency of light filtering.

TABLE 5

| No. # | $Ag^+$ (ppm) | AA (mM) | BLB (%) | Material-Covered Wavelength (nm) |
|---|---|---|---|---|
| #6 | 1.5 | 4 | 8.3% | 380-645 |
| #7 | 1.5 | 2 | 7.4% | 380-601 |
| #8 | 1.5 | 1 | 6.8% | 380-455 |
| #9 | 1.5 | 0.5 | 9.9% | 380-666 |
| #10 | 13.5 | 4 | 10.0% | 380-675 |
| #11 | 13.5 | 2 | 13.6% | 380-588 |
| #12 | 13.5 | 1 | 13.5% | 380-635 |
| #13 | 13.5 | 0.5 | 15.6% | 380-667 |
| #14 | 0 | 0 | 14.1% | 380-474 |
| #15 | 1.5 | 4 | 15.2% | 380-610 |
| #16 | 1.5 | 2 | 17.5% | 380-623 |
| #17 | 1.5 | 1 | 16.7% | 380-646 |
| #18 | 1.5 | 0.5 | 16.1% | 380-532 |
| #19 | 13.5 | 4 | 18.1% | 380-630 |
| #20 | 13.5 | 2 | 17.1% | 380-645 |
| #21 | 13.5 | 1 | 22.3% | 380-521 |
| #22 | 13.5 | 0.5 | 34.3% | 380-656 |
| #23 | 0 | 0 | 2.5% | 380-392 |

Example 10

150 ml of mixture was first prepared by using DI water to dissolve PAA and trisodium citrate with the final concentration 2.5 mg/ml and 0.025 M respectively. Sonication was allowed in order to speed up the dissolution process. After that, 0.2 M, 37.5 mL of PVP (29 kDa) and 37.5 mL of borate buffer (without sodium chloride) were added. The mixture was stirred for another 5 minutes. Then, 75 ml of silver nitrate was added slowly under stirring. Finally, 0.01 M PTB solution was added to mix with the solution, and stirred for another 1 hour. The final concentration of silver nitrate was 22.5 ppm.

Next, 1.2 ml of the resultant mixture with 1 dried hydrogel contact lens per container was set. After all the contact lenses in dried state were immersed in the mixture for at least 30 minutes, they were heated by water steamed for 2 hours at 85° C. Then, all the contact lenses were washed with DI water twice to remove unreacted mixture. After that, they were extracted with borate buffered saline 3 times for 30 minutes at 60° C., sealed in glass vials containing 3 ml of borate buffered saline with additionally various chemicals such as mini hyaluronic acid (mini HA) and sterilized at 121° C. for 30 minutes.

Although ascorbic acid used in Example 9 had been demonstrated to be detrimental to blue-light blocking efficacy, however, as shown in Table 6, ascorbic acid used in package solution (sample #25) for sterilization was beneficial to enhance blue-light blocking efficacy as compared with those sterilized in borate buffered saline only (sample #24). Moreover, with sufficient amount of mini hyaluronic acid (mini HA) addition, the blue-light blocking efficacy can be significantly increased from 52.9% to 67.4%. These results suggest that ascorbic acid and mini HA (under proper heating process, including sterilization) perform addictive effect on blue-light blocking efficacy. Therefore, ascorbic acid with proper control can also addictively help metal reduction, resulting in enhanced blue-light blocking efficacy.

TABLE 6

| | Package solution | | | |
|---|---|---|---|---|
| Sample | Ascorbic acid (mM) | Trisodium citrate (mM) | Mini HA (wt %) | BLB (%) |
| #24 | 0 | 0 | 0% | 41.7% |
| #25 | 1 | 0 | 0% | 51.7% |
| #26 | 0.01 | 0 | 0% | 42.6% |
| #27 | 1 | 2 | 0% | 52.9% |
| #28 | 1 | 2 | 0.1% | 51.6% |
| #29 | 1 | 2 | 0.3% | 67.4% |

Example 11

150 ml of reaction mixture was first prepared by using DI water to dissolve poly(acrylamide-co-acrylic acid) and trisodium citrate with the final concentration 2.5 or 20 mg/ml and 0.025 M respectively in a glass bottle. Then, the glass bottle was placed in an ultrasonic sonicator and kept sonicating when preparing the following reaction mixture. 0.2 M, 37.5 mL of PVP (29 kDa) and 37.5 mL of borate buffer (without sodium chloride) were slowly added. After another 3 minutes, 75 ml of silver nitrate was added slowly. Finally, 0.01 M PTB solution was added to mix with the solution, and sonicated for another 3 minutes. The final concentration of silver nitrate was 22.5 ppm.

Next, 1.2 ml of the resultant mixture with 1 dried hydrogel contact lens per container was set. After all the dried contact lenses were immersed in the mixture for at least 30 minutes, they were heated by water steamed for 2 hours at 85° C. Then, all the contact lenses were washed with DI water twice to remove unreacted mixture. After that, they were extracted with borate buffered saline once for 1 hour at 60° C. Finally, the resultant contact lenses were packed in blister package with either borate buffered saline only, 9217 surfactant with 0.5 wt % of CMC (carboxymethyl cellulose, 250 kDa) and 0.1 wt % of HA (hyaluronic acid, 1000 kDa), or, 9217 surfactant with 0.5 wt % of CMC, 0.1 wt % of HA, 0.2 wt % of mini HA and 0.25 mM ascorbic acid, and sterilized at 121° C. for 30 minutes.

The performance of resultant contact lenses (sample #30 to sample #33) with commercial products was summarized in Table 7. As shown in Table 7, CIE LAB referred to CIE LAB color space measured through a UV-Vis spectrophotometry. Each of ΔE value was obtained by distance measurement between the resultant contact lens and control contact lens (transparent contact lens without any dye labeling or other material modifications). WBUT referred to water break up time. Notably, the resultant contact lens, sample #32 was more close to transparent than those of commercial products, SmartVision (daily) and Miacare Relux, yet the blue-light blocking efficacy of contact lens (sample #32) was substantially higher than those commercial products. Moreover, the surficial behaviors of resultant contact lenses (samples #30-#33) after blue-light blocking material modification were largely improved as compared with control contact lens (sample #23). The behaviors of the contact lenses in the present disclosure were compatible or even better than those of commercial products.

TABLE 7

| | \multicolumn{3}{c}{Experimental conditions} | | | | | |
|---|---|---|---|---|---|---|---|---|
| Item | Smart Vision daily | FreshKon daily | Miacare Relux | #23 | #30 | #31 | #32 | #33 |
| PAA (mg/mL) | — | — | — | — | 0.5 | 0.5 | 20 | 20 |
| Borate buffered saline | N/A | N/A | N/A | O | O | N/A | N/A | N/A |
| 9217 Surfactant/ CMC/HA | N/A | N/A | N/A | N/A | N/A | N/A | O | N/A |
| 9217 Surfactant/ CMC/HA/ Ascorbic acid/ mini HA | N/A | N/A | N/A | N/A | N/A | O | N/A | O |
| | | | Contact lens property | | | | | |
| CIE LAB (L*a*b*) | [78.13, −4.59, 12.08] | [75.25, −5.90, 4.82] | [77.5, −4.48, 14.14] | [79.61, −0.91, 19.92] | [76.68, −7.4, 19.92] | [76.67, −6.93, 16.65] | [77.57, −5.58, 9.68] | [76.79, −8.07, 19.28] |
| CIE LAB (ΔE) | 12.94 | 7.94 | 14.83 | 4.11 | 21.26 | 18.05 | 11.17 | 20.91 |
| Blue Light blocking (%) | 22.5% | 10.6% | 14.4% | 2.5% | 42.1% | 48.0% | 30.1% | 40.4% |
| Advancing contact angle (degree) | 52.9° | 67.4° | 85.6° | 64.7° | 61.0° | 56.9 | 58.3° | 56.6° |
| Hysteresis (degree) | 18.0° | 32.8° | 49.7° | 35.7° | 24.0° | 19.4 | 20.9° | 18.7° |
| WBUT (s) | 60.3 | 67.5 | 36.0 | 31.9 | 76.6 | 82.5 | 76.0 | 76.6 |

As described above, according to the embodiments of the present disclosure, a contact lens and a method of manufacturing thereof are provided. The contact lens includes a plurality of blue light blocking material dispersed on contact lens body. Specifically, the metal particles located at central region of the contact lens are more than that of in peripheral region. The method of the present disclosure provides a controllable and efficient strategy for manufacturing contact lenses to achieve synergistic and/or addictive increase of blue light blocking efficacy and improved surface properties. The contact lenses of the preset disclosure have good blue light blocking property and exhibit relatively less yellowish appearance compared with commercial contact lenses. In addition, the contact lens of the present disclosure has improved surface properties including contact angle, water break-up time and long-term protein depositions, without affecting the intrinsic properties of pristine contact lens such as physical diameter, water content, oxygen permeability and modulus.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A contact lens, comprising:
    a contact lens body comprising a first region and a second region surrounding the first region, wherein the contact lens body comprises pyrrolidone group; and
    a plurality of metal particles covering the contact lens body, wherein a content of the metal particles is about 1 wt % to about 20 wt % based on a total weight of the contact lens, the metal particles is silver, gold, cobalt, manganese, nickel, copper, zinc, platinum, palladium, cadmium, indium, potassium, calcium, iron, or combinations thereof, and the metal particles in the first region are more than in the second region.

2. The contact lens of claim 1, wherein the plurality of metal particles have a diameter of about 1-10000 nm.

3. The contact lens of claim 1, wherein the contact lens exhibits tunable plasmonic resonances at visible light ranged from 380-800 nm.

4. The contact lens of claim 1, wherein the contact lens inhibits about 5% to about 99% of blue light at wavelength ranged within 380 nm to about 480 nm.

* * * * *